(12) United States Patent
Bushey et al.

(10) Patent No.: US 7,694,386 B2
(45) Date of Patent: Apr. 13, 2010

(54) CASTER WHEEL COVER

(76) Inventors: Richard D. Bushey, 1596 38th Ave., Kenosha, WI (US) 53144; Bret L. Bushey, 5335 Sandhill Rd., Caledonia, WI (US) 53402

( * ) Notice: Subject to any disclaimer, the term of this patent is extended or adjusted under 35 U.S.C. 154(b) by 654 days.

(21) Appl. No.: 11/519,512

(22) Filed: Sep. 12, 2006

(65) Prior Publication Data
US 2007/0062001 A1 Mar. 22, 2007

Related U.S. Application Data

(60) Provisional application No. 60/718,459, filed on Sep. 19, 2005.

(51) Int. Cl.
*A47B 91/00* (2006.01)
(52) U.S. Cl. .............................. 16/45; 16/47
(58) Field of Classification Search .............. 16/45–47, 16/36, 25; 301/5.1, 5.307, 5.309, 7, 63.109, 301/64.701, 64.702, 64.703, 105.1
See application file for complete search history.

(56) References Cited

U.S. PATENT DOCUMENTS

| 1,433,301 | A | * | 10/1922 | Robb | 152/394 |
| 2,267,403 | A | * | 12/1941 | Herold | 16/45 |
| 3,387,894 | A | * | 6/1968 | Louik | 301/64.701 |
| 3,815,173 | A | * | 6/1974 | Haussels | 16/45 |
| 3,894,776 | A | * | 7/1975 | Black | 301/64.706 |
| 4,295,256 | A | * | 10/1981 | Pascal | 29/894.32 |
| 4,351,084 | A | * | 9/1982 | Fontana | 16/45 |
| 4,783,880 | A | * | 11/1988 | Chapman et al. | 16/45 |
| 6,553,618 | B2 | * | 4/2003 | Whitley | 16/91 |
| 6,748,623 | B1 | * | 6/2004 | Tsai | 16/47 |

* cited by examiner

*Primary Examiner*—Chuck Y. Mah
(74) *Attorney, Agent, or Firm*—Boyle Fredrickson, S.C.

(57) ABSTRACT

A castor wheel cover is provided for mounting on a wheel of a castor wheel assembly. The wheel has an outer surface and the castor wheel cover includes a floor engaging member having inner and outer surfaces. First and second sidewalls projecting from corresponding first and second side edges of the floor engaging member so as to define a channel therebetween. The channel is adapted for receiving the outer surface of the wheel therein.

12 Claims, 2 Drawing Sheets

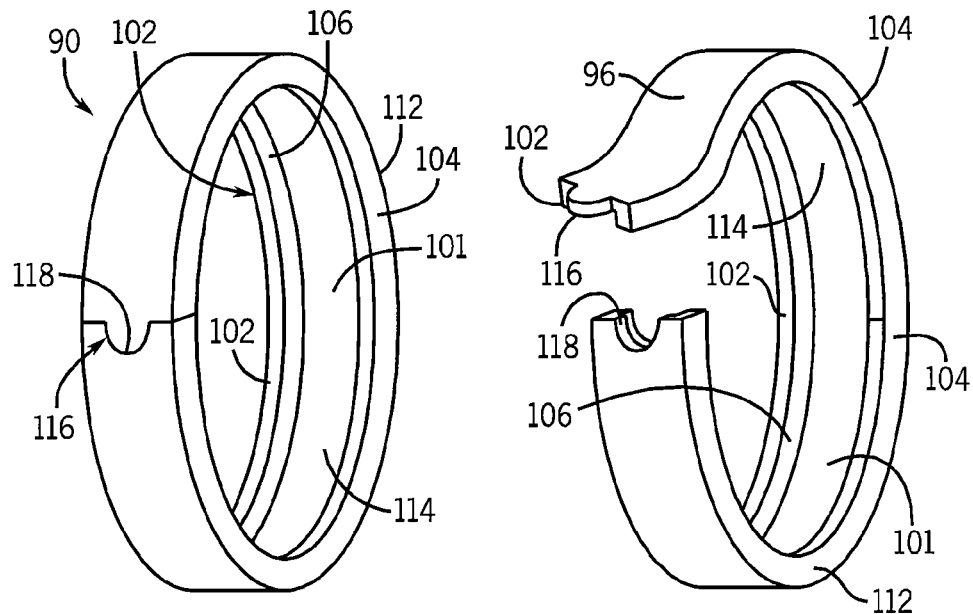
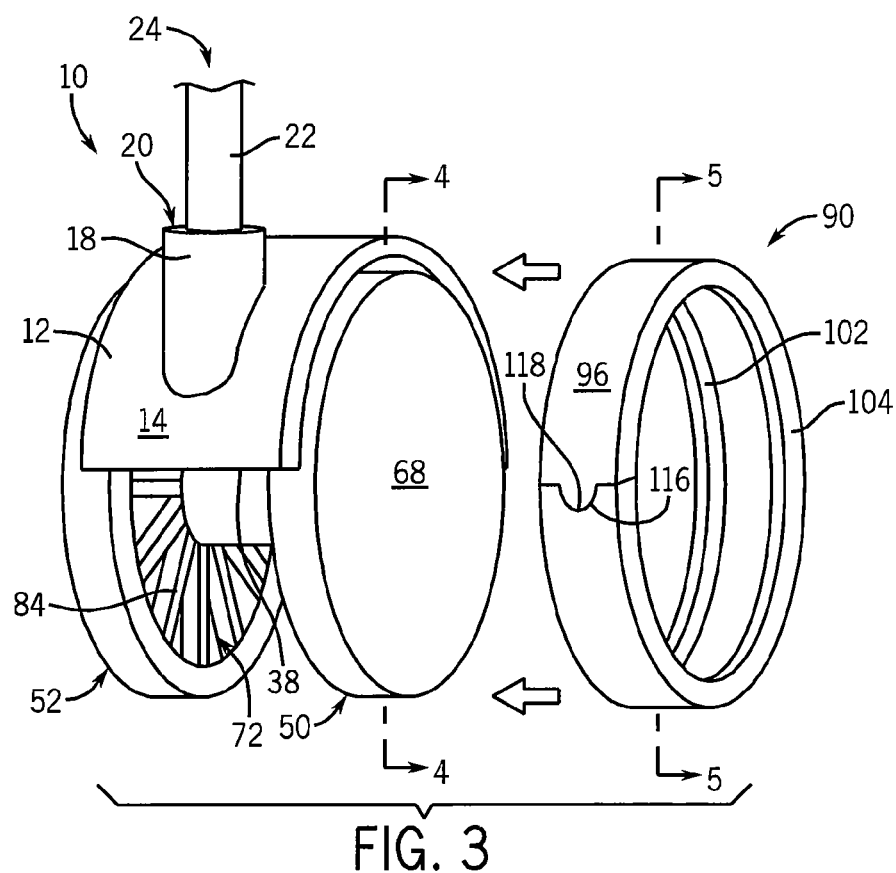

CASTER WHEEL COVER

CROSS-REFERENCE TO RELATED APPLICATIONS

This application claims the benefit of U.S. Provisional Application Ser. No. 60/718,459, filed Sep. 19, 2005.

FIELD OF THE INVENTION

This invention relates generally to caster wheels, and in particular, to a caster wheel cover mountable about the outer periphery of a caster wheel in order to prevent the caster wheel from marring the supporting surface on which the caster wheel is used.

BACKGROUND OF THE INVENTION

As is known, caster wheels are often interconnected to various objects such as furniture, file cabinets, luggage and the like to facilitate the movement of the item along a supporting surface. These objects are often manufactured with the caster wheels already mounted thereon. However, some objects contemplate the mounting of the caster wheels by end user after purchases of the objects. In both arrangements, it is readily understood that the caster wheels must have sufficient strength to adequately support the object as the object is transported along the supporting surface. If a caster wheel is fabricated from a material of insufficient strength, it is possible the for the caster wheel to collapse as the object is transported over the supporting surface. This, in turn, may result in damage to the object traveling on the caster wheels and to the flooring on which the object is being transported.

In view of the foregoing, caster wheel manufacturers have been known to fabricate caster wheels from very strong materials such as metals and hard plastic. While functional for their intended purpose, there are certain inherent problems associated with the use of caster wheels fabricated from these types of materials. For example, it can be appreciate that caster wheels may be used to transport objects on various types of flooring that may be more susceptible to damage. For example, flooring such as linoleum or hardwood may be marred or permanently damaged when subjected to caster wheels fabricated from metal or hard plastic. Further, if the caster wheels are used to support heavy objects, the damage to flooring such as linoleum or hardwood may be even more significant.

Therefore, it is a primary object and feature of the present invention to provide a caster wheel cover adapted for receipt on the outer periphery of a caster wheel that limits the damage associated with use of the caster wheel on certain types of flooring.

It is a further object and feature of the present invention to provide a caster wheel cover adapted for receipt on the outer periphery of a caster wheel that may be simply and easily mounted about the outer periphery of the caster wheel.

It is a still further object and feature of the present invention to provide a caster wheel cover that does not interfere with operation of the caster wheel as the caster wheel transports an object over a supporting surface in a user desired direction.

It is a still further object and feature of the present invention to provide a caster wheel cover that may be simply and easily mounted about the outer periphery of the caster wheel and that may be simply and easily replaced when worn.

In accordance with the present invention, a castor wheel cover is provided for mounting on a wheel of a castor wheel assembly. The wheel has an outer surface. The castor wheel cover includes a floor engaging member having inner and outer surfaces and first and second side edges first and second sidewalls project from corresponding first and second side edges so as to define a channel therebetween. The channel is adapted for receiving the outer surface of the wheel therein.

It is contemplated for the first sidewall to include at least one notch therein and for floor engaging member to have first and second ends. The first and second ends of the floor engaging member forming a mating relationship with the wheel received in the channel. The first end of the floor engaging member may include a male projection and the second end of the floor engaging member may include a female recess adapted for receiving the male projection. An adhesive may be provided along the inner surface of the floor engaging member for affixing the floor engaging member to the outer surface of the wheel.

In accordance with a further aspect of the present invention, a castor wheel cover is provided for mounting on a wheel of a castor wheel assembly. The wheel has a outer surface. The castor wheel cover includes a floor engaging member having inner and outer surfaces, and an adhesive provided on the inner surface of the floor engaging member. The adhesive affixes the floor engaging member to the outer surface of the wheel.

The floor engaging member includes first and second edges and the castor wheel cover also includes first and second sidewalls projecting from corresponding edges of the base. Each sidewall has an inner surface and an outer surface. The first sidewall may includes a radially inner edge having first and second notches formed therein. Alternatively, the floor engaging member may include first and second ends wherein the first end of the floor engaging member forms a mating relationship with the second end of the floor engaging member. For example, the first end of the floor engaging member may include a male projection and the second end of the floor engaging member may include a female recess adapted for receiving the male projection.

In accordance with a still further aspect of the present invention, an improvement in a caster wheel assembly having a wheel rotatably supported on a central axle is provided. The wheel includes first and second sides and an outer peripheral surface therebetween. The improvement includes a base having an inner surface engageable with the outer peripheral surface of the wheel, an outer surface engageable with a supporting surface, and first and second sides. First and second sidewalls project from corresponding sides of the base. Each sidewall has an inner surface and an outer surface. The inner surface of the first sidewall overlaps at least a portion of the first side of the wheel and the inner surface of the second sidewall overlaps at least a portion of the second side of the wheel.

It is contemplated for the base to include first and second ends. The first end of the base forms a mating relationship with the second end of the base. By way of example, the first end of the base may include a male projection and the second end of the base may include a female recess adapted for receiving the male projection. Alternatively, the first sidewall may include a radially inner edge having first and second notches formed therein. An adhesive along the inner surface of the base for affixing the base to the outer peripheral surface of the wheel.

BRIEF DESCRIPTION OF THE DRAWINGS

The drawings furnished herewith illustrate a preferred construction of the present invention in which the above advantages and features are clearly disclosed as well as other which will be readily understood from the following description of the illustrated embodiment.

In the drawings:

FIG. 1 is an isometric view of a first embodiment of a caster wheel cover in accordance with the present invention in a closed configuration;

FIG. 2 is an isometric to view of the first embodiment of the caster wheel cover of FIG. 1 in an open configuration;

FIG. 3 is an exploded isometric view of a caster wheel assembly adapted for receiving the caster wheel cover of the present invention;

DETAILED DESCRIPTION OF THE DRAWINGS

Figure 7:
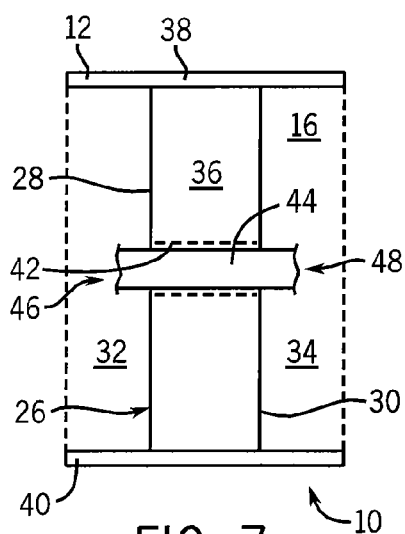
FIG. 7 is a bottom plan view of the caster wheel assembly of FIG. 3.

Referring to FIGS. 3 and 7, a caster wheel assembly for receiving the caster wheel cover of the present invention is generally designated by the reference numeral 10. Caster wheel assembly 10 includes a generally flat, arcuate shroud 12 having an upper surface 14 and a lower surface 16. Tubular neck 18 projects along a predetermined axis from upper surface 14 of shroud 12 and is adapted for receiving a first end 20 of coupling stem 22. Coupling stem 22 includes an upper, second end 24 that is receivable within a mounting bracket interconnected to an object to be supported by caster wheel assembly 10. As is conventional, shroud 12 is pivotable on coupling stem 22 about the axis of neck 18.

As best seen in FIG. 7, partition 26 projects from lower surface 16 of shroud 12. Partition 26 includes first and second sides 28 and 30, respectively, that define corresponding wheel wells 32 and 34, respectively. First and second sides 28 and 30, respectively, of partition 26 are interconnected by a lower surface 36 of partition that extends between terminal ends 38 and 40, respectively of shroud 12. Partition 26 further includes passageway 42 extending along an axis between first and second sides 28 and 30, respectively, thereof. Passageway 42 through partition 26 is adapted for receiving rotatable axle 44 therethrough.

Figure 4:
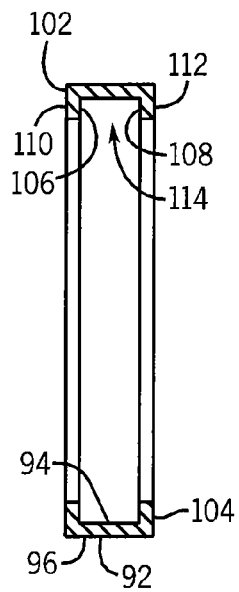
FIG. 4 is cross sectional view of the caster wheel assembly taken along line 4-4 of FIG. 3.
Figure 5:
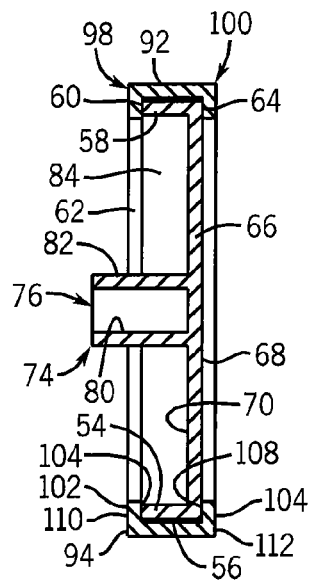
FIG. 5 is cross sectional view of the caster wheel wheel cover of the present invention taken along line 5-5 of FIG. 3.

Axle 44 includes first and second opposite ends 46 and 48, respectively, adapted for receiving corresponding wheels 50 and 52, respectively, thereon. It can be appreciated that wheels 50 and 52 are identical in structure. As such, the following description of wheel 50 is understood to describe wheel 52 as if fully described hereinafter. Referring to FIGS. 3-4, wheel 50 includes a generally circular outer wall 54 having an outer surface 56 and an inner surface 58. Outer wall 54 of wheel 50 is further defined by an inner edge 60 that defines an opening 62 and an outer edge 64. Disc-shaped sidewall 66 overlaps outer edge 64 and includes an outer surface 68 and an inner surface 70. Inner surface 58 of outer wall 54 and inner surface 70 of sidewall 66 define cavity 72 within wheel 50.

Tubular hub 74 projects axially from the center of inner surface 70 of sidewall 66 into cavity 72. Hub 74 includes a first open end 76 and a second closed end 78 adjacent inner surface 70 of sidewall 66. Inner surface 80 of hub 74 defines an axle receiving cavity for receiving a desired end 46 or 48 of axle 44. Outer surface 82 of hub 74 is directed towards inner surface 58 of outer wall 54 and interconnected thereto by a plurality of circumferentially spaced spokes 84. Each spoke 84 has a first end interconnected outer surface 82 of hub 74, a second end interconnected to inner surface 58 of outer wall 54, a first side interconnected to inner surface 70 of sidewall 66, and a second side spaced from and directed towards opening 62 defined by inner edge 60 of outer wall 54. It can be appreciated that spokes 84 add strength and stability to wheels 50 and 52.

In order to assemble castor wheel assembly 10, axle 44 is inserted through passageway 42 in partition 26 such that first end 46 of axle 44 projects from a first end of passageway 42 and a second end 48 of axle 44 projects from a second end of passageway 42. Hub 74 of wheel 50 is press fit onto first end 46 of axle 44 such that first end 46 of axle 44 is received within the axle receiving cavity defined by inner surface 80 of hub 74 of wheel 50. Similarly, hub 74 of wheel 52 is press fit onto second end 48 of axle 44 such that second end 48 of axle 44 is received within the axle receiving cavity defined by inner surface 80 of hub 74 of wheel 52. With castor wheel assembly 10 in its assembled configuration, wheels 50 and 52 are positioned within corresponding wheel wells 32 and 34, respectively, and rotatable about the axis of passageway 42 through partition 26.

It is noted that the structure of castor wheel assembly 10 is merely exemplary of a caster wheel assembly for use with the caster wheel cover of the present invention. It is contemplated to use the castor wheel cover of the present invention with castor wheel assemblies having different structures without deviating from the scope of the present invention.

Referring to FIGS. 1-2, a first embodiment of a castor wheel cover in accordance with the present invention is generally designated by the reference numeral 90. Castor wheel cover 90 is fabricated from a soft material such as vinyl that would not damage the flooring on which castor wheel assembly 10 is used. Castor wheel cover 90 includes floor engaging portion 92 having inner and outer surfaces 94 and 96, respectively, and first and second edges 98 and 100, respectively. Adhesive 101 is provided on inner surface 94 of floor engaging portion 92 of castor wheel cover 90 along the entire length thereof, for reasons hereinafter described. First and second sidewalls 102 and 104, respectively, project from corresponding first and second edges 98 and 100, respectively, of floor engaging portion 92. Sidewalls 102 and 104 include corresponding inner surfaces 106 and 108, respectively, and corresponding outer surfaces 110 and 112, respectively. Inner surfaces 106 and 108 of sidewalls 102 and 104, respectively, and inner surface 94 of floor engaging portion 92 define channel 114 extending along the entire length of castor wheel cover 90.

First end 116 of castor wheel cover 90 and second end 118 of castor wheel cover 90 are configured to form a mating relationship with each other. By way of example, first end 116 of castor wheel cover 90 may be contoured to have a male projection and second end 118 of castor wheel cover 90 may be contoured to have a female recess for receiving the male projection in a mating relationship. However, it is contemplated for first end 116 of castor wheel cover 90 and second end 118 of castor wheel cover 90 to be generally straight, without deviating from the scope of the present invention.

In operation, castor wheel cover 90 is wrapped around a desired wheel 50 or 52 of castor wheel assembly 10 such that outer wall 54 is received within channel 114. Adhesive 101 joins inner surface 94 of floor engaging portion 92 of castor wheel cover 90 to outer surface 56 of outer wall 54. It is contemplated for sidewalls 102 and 104 of castor wheel cover 90 to overlap corresponding inner and outer edges 60 and 64, respectively, of the desired wheel 50 or 52 and for sidewall 104 to partially overlap sidewall 66 of such wheel. Further, it is intended for first end 116 of castor wheel cover 90 to form a mating relationship with second end 118 of castor wheel cover 90. As described, when mounted on a desired wheel 50 and 52 of castor wheel assembly 10, castor wheel cover 90 has a generally circular configuration. Further, it is intended that the outer surface 94 of floor engaging portion 90 be radially spaced from lower surface 16 of shroud 12. As described, wheels 50 and 52 are free to rotate on axle 44 such that castor wheel assembly 10 may be used in a conventional matter.

Figure 6:
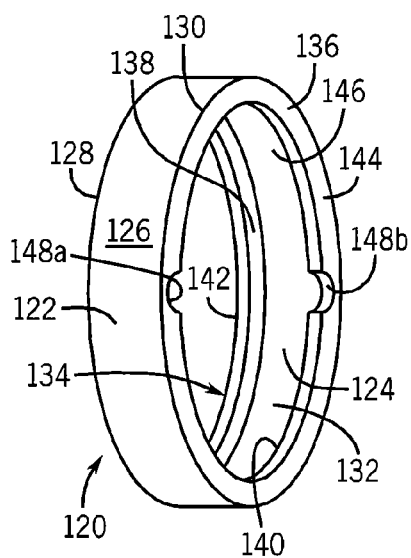
FIG. 6 is an isometric view of a second embodiment of a caster wheel cover in accordance with the present invention.

Referring to FIG. 6, an alternate embodiment of the castor wheel cover of the present invention is generally designated by the reference numeral 120. Castor wheel cover 120 is also fabricated from a soft material such as vinyl that would not damage the flooring on which castor wheel assembly 10 is used. Castor wheel cover 120 includes a generally circular, floor engaging portion 122 having inner and outer surfaces 124 and 126, respectively, and first and second edges 128 and 130, respectively. Adhesive 132 may be provided along the entire length of inner surface 124 of floor engaging portion 122 of castor wheel cover 120, along a portion of the length thereof, or not at all. First and second sidewalls 134 and 136, respectively, extend radially inward from corresponding first and second edges 128 and 130, respectively, of floor engaging portion 122. Sidewalls 134 and 136 include corresponding inner surfaces 138 and 140, respectively, and corresponding outer surfaces 142 and 144, respectively. Inner surfaces 138 and 140 of sidewalls 134 and 136, respectively, and inner surface 124 of floor engaging portion 122 define channel 146 within castor wheel cover 120.

Castor wheel cover 120 may include one or more installation notches 148a and 148b provided in second sidewall 136. Installation notches 148a and 148b in sidewall 136 of castor wheel cover 120 are circumferentially spaced and intended to facilitate the mounting of castor wheel cover 120 on a desired wheel 50 or 52 of caster wheel assembly 10, as hereinafter described. The number and location of the installation notches 148a and 148b in sidewall 136 of castor wheel cover 120 are dependant upon the size and thickness of wheels 50 and 52, as well as, the pliability of the material from which castor wheel cover 120 is fabricated.

In operation, castor wheel cover 120 is wrapped around a desired wheel 50 or 52 of castor wheel assembly 10 such that outer wall 54 is received within channel 146. When provided, installation notches 148a and 148b are intended to be directed toward the desired wheel 50 or 52 during installation so as to allow sidewall 136 of castor wheel cover 120 to be positioned more easily over inner edge 60 of outer wall 54 of the desired wheel 50 or 52. However, caster wheel cover 120 may be fabricated without installation notches 148a and 148b without deviating from the scope of the present invention. Adhesive 132, if desired, may be used to join inner surface 124 of floor engaging portion 122 of castor wheel cover 120 to outer surface 56 of outer wall 54 of the desired wheel 50 or 52. It is contemplated for sidewalls 134 and 136 of castor wheel cover 120 to overlap corresponding outer and inner edges 64 and 60, respectively, of a corresponding floor engaging portion 122 of the desired wheel 50 or 52 and for sidewall 134 to partially overlap sidewall 66 of such wheel. Further, it is intended that the outer surface 124 of floor engaging portion 122 be radially spaced from lower surface 16 of shroud 12. As described, wheels 50 and 52 are free to rotate on axle 44 such that castor wheel assembly 10 may be used in a conventional matter.

Figure 8:
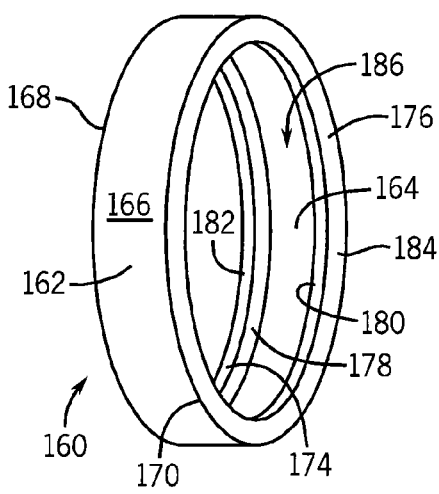
FIG. 8 is an isometric view of a third embodiment of a caster wheel cover in accordance with the present invention.

Referring to FIG. 8, a still further embodiment of the castor wheel cover of the present invention is generally designated by the reference numeral 160. Castor wheel cover 160 is also fabricated from a soft material such as vinyl that would not damage the flooring on which castor wheel assembly 10 is used. Castor wheel cover 160 includes a generally circular, floor engaging portion 162 having inner and outer surfaces 164 and 166, respectively, and first and second edges 168 and 170, respectively. Adhesive may be provided along the entire length of inner surface 164 of floor engaging portion 162 of castor wheel cover 160, along a portion of the length thereof, or not at all. First and second sidewalls 174 and 176, respectively, extend radially inward from corresponding first and second edges 168 and 170, respectively, of floor engaging portion 162. Sidewalls 174 and 176 include corresponding inner surfaces 178 and 180, respectively, and corresponding outer surfaces 182 and 184, respectively. Inner surfaces 178 and 180 of sidewalls 174 and 176, respectively, and inner surface 164 of floor engaging portion 162 define channel 186 within castor wheel cover 160.

In operation, castor wheel cover 160 is wrapped around a desired wheel 50 or 52 of castor wheel assembly 10 such that outer wall 54 is received within channel 186. Adhesive, if desired, may be used to join inner surface 164 of floor engaging portion 162 of castor wheel cover 160 to outer surface 56 of outer wall 54 of the desired wheel 50 or 52. It is contemplated for sidewalls 174 and 176 of castor wheel cover 160 to overlap corresponding outer and inner edges 64 and 60, respectively, of desired wheel 50 or 52 and for sidewall 174 to partially overlap sidewall 66 of such wheel. Further, it is intended that the outer surface 164 of floor engaging portion 162 be radially spaced from lower surface 16 of shroud 12. As described, wheels 50 and 52 are free to rotate on axle 44 such that castor wheel assembly 10 may be used in a conventional matter.

Various alternatives are contemplated as being within the following claims particularly pointing out and distinctly claiming the subject matter regarded as the invention.

We claim:

1. An improvement in a caster wheel assembly having a wheel rotatably supported on a central axle, the wheel including a generally planar first side, a generally planer second side, and an outer peripheral surface therebetween, the improvement comprising:
   a caster wheel cover including:
      a generally circular, floor engaging portion having an inner surface engageable with the outer peripheral surface of the wheel, an outer surface engageable with a supporting surface, and first and second sides; and
      first and second sidewalls projecting from corresponding sides of the floor engaging portion, each sidewall having an inner surface and an outer surface;
   wherein:
      the inner surface of the first sidewall overlaps at least a portion of the first side of the wheel and the inner surface of the second sidewall overlaps at least a portion of the second side of the wheel;
      the inner surface of the first sidewall lying in a first plane laterally spaced from the first side of the wheel; and
      the inner surface of the second sidewall lying in a second plane laterally spaced from the second side of the wheel.

2. The improvement of claim 1 wherein the floor engaging portion includes first and second ends.

3. The improvement of claim 2 wherein the first end of the floor engaging portion forms a mating relationship with the second end of the floor engaging portion.

4. The improvement of claim 1 wherein the first end of the floor engaging portion includes a male projection and the second end of the floor engaging portion includes a female recess adapted for receiving the male projection.

5. The improvement of claim 1 wherein the first sidewall includes a radially inner edge, the inner edge including a first notch formed therein.

6. The improvement of claim 5 wherein the first sidewall includes a second notch formed therein.

7. The improvement of claim 1 further comprising an adhesive along the inner surface of the floor engaging portion for affixing the floor engaging portion to the outer peripheral surface of the wheel.

8. A castor wheel cover for mounting on a wheel of a castor wheel assembly, the wheel having an outer surface, comprising:
   a generally circular, floor engaging member having an inner surface engageable with the outer surface of the wheel, an outer surface engageable with a supporting surface, and first and second side edges; and
   first and second sidewalls projecting radially inward from corresponding first and second side edges so as to define a channel therebetween for receiving an outer portion of the wheel therein;
   wherein the first sidewall includes at least one notch therein.

9. A castor wheel cover for mounting on a wheel of a castor wheel assembly, the wheel having an outer surface, comprising:
   a generally circular, floor engaging member having an inner surface engageable with the outer surface of the wheel, an outer surface engageable with a supporting surface, and first and second side edges; and
   first and second sidewalls projecting radially inward from corresponding first and second side edges so as to define a channel therebetween for receiving an outer portion of the wheel therein;
   wherein:
      the floor engaging member has first and second ends, the first and second ends of the floor engaging member forming a mating relationship with the wheel received in the channel; and
      the first end of the floor engaging member includes a male projection and the second end of the floor engaging member includes a female recess adapted for receiving the male projection.

10. A castor wheel cover for mounting on a wheel of a castor wheel assembly, the wheel having a outer surface, comprising:
    a generally circular floor engaging member having an inner surface engageable with the outer surface of the wheel, an outer surface engageable with a supporting surface, and first and second edges;
    first and second sidewalls projecting from corresponding edges of the floor engaging member, each sidewall having an inner surface and an outer surface; and
    an adhesive provided on the inner surface of the floor engaging member for affixing the floor engaging member to the outer surface of the wheel;
    wherein the first sidewall includes a radially inner edge, the inner edge including a first notch formed therein.

11. The castor wheel cover of claim 10 wherein the first sidewall includes a second notch formed therein.

12. A castor wheel cover for mounting on a wheel of a castor wheel assembly, the wheel having a outer surface, comprising:
    a generally circular floor engaging member having an inner surface engageable with the outer surface of the wheel and an outer surface engageable with a supporting surface; and
    an adhesive provided on the inner surface of the floor engaging member for affixing the floor engaging member to the outer surface of the wheel;
    wherein:
       the floor engaging member includes first and second ends;
       the first end of the floor engaging member forms a mating relationship with the second end of the floor engaging member; and
       the first end of the floor engaging member includes a male projection and the second end of the floor engaging member includes a female recess adapted for receiving the male projection.

* * * * *